US012347589B2

(12) United States Patent
Bengtsson et al.

(10) Patent No.: US 12,347,589 B2
(45) Date of Patent: Jul. 1, 2025

(54) DYNAMIC CABLES WITH FIBRE REINFORCED THERMOPLASTIC COMPOSITE SHEATH

(71) Applicant: NEXANS, Courbevoie (FR)

(72) Inventors: Karl Magnus Bengtsson, Oslo (NO); Audun Johanson, Oslo (NO); Anton Akulichev, Halden (NO)

(73) Assignee: NEXANS, Courbevoie (FR)

(*) Notice: Subject to any disclaimer, the term of this patent is extended or adjusted under 35 U.S.C. 154(b) by 145 days.

(21) Appl. No.: 18/141,368

(22) Filed: Apr. 29, 2023

(65) Prior Publication Data

US 2023/0352212 A1 Nov. 2, 2023

(30) Foreign Application Priority Data

May 2, 2022 (EP) .................................... 22305648

(51) Int. Cl.

*H01B 7/28* (2006.01)
*H01B 7/14* (2006.01)
*H01B 7/282* (2006.01)
*H01B 9/00* (2006.01)

(52) U.S. Cl.

CPC ............. *H01B 7/2825* (2013.01); *H01B 7/14* (2013.01); *H01B 9/006* (2013.01)

(58) Field of Classification Search

CPC ... H01B 1/02; H01B 1/04; H01B 1/06; H01B 7/282; H01B 7/02; H01B 7/04; H01B 7/06; H01B 7/0861; H01B 7/1815; H01B 7/14; H01B 7/18; H01B 7/28; H01B 9/02; H01B 9/04; H01B 9/06; H01B 11/085; H01B 11/1033; H01B 11/1016; B32B 37/24; B32B 37/203; B32B 15/20; B32B 15/08; B32B 27/281; B32B 2037/243

USPC ............. 174/36, 110 R–120 SC; 156/60, 84, 156/308.6, 308.8; 244/11

See application file for complete search history.

(56) References Cited

U.S. PATENT DOCUMENTS 3,602,636 A * 8/1971 Evans .................... H01B 7/295 174/110 AR
3,745,233 A * 7/1973 Lania ...................... B32B 27/00 427/118
4,454,379 A * 6/1984 Cleveland ............ H01B 7/2825 174/106 SC
4,675,474 A * 6/1987 Neuroth ................. H01B 7/182 174/120 AR (Continued)

FOREIGN PATENT DOCUMENTS

CN 212874126 U * 4/2021 ............... H01B 7/14
EP 2312591 A1 * 4/2011 ............... H01B 1/12
JP HOS 17849 3/1993

OTHER PUBLICATIONS

Resner Leszek et al: "Radial Water Barrier in Submarine Cables, Current Solutions and Innovative Development Directions", Energies, May 12, 2021.

(Continued)

*Primary Examiner* — William H. Mayo, III

(74) *Attorney, Agent, or Firm* — CANTOR COLBURN LLP

(57) ABSTRACT

A dynamic power cable or power cables for submarine applications has at least one extruded fibre reinforced thermoplastic composite core sheath arranged radially around a water barrier sheath.

15 Claims, 1 Drawing Sheet

(56) References Cited

U.S. PATENT DOCUMENTS

| | | | | | |
|---|---|---|---|---|---|
| 4,725,693 | A * | 2/1988 | Hirsch | B32B 7/14 174/106 SC |
| 5,310,964 | A * | 5/1994 | Roberts | H01B 7/295 174/106 SC |
| 9,029,705 | B2 * | 5/2015 | Furuheim | H01B 7/28 174/102 R |
| 9,058,917 | B2 * | 6/2015 | Koelblin | H01B 7/2825 |
| 2011/0005795 | A1 | 1/2011 | Deighton et al. | |
| 2011/0048765 | A1 * | 3/2011 | Eggertsen | H01B 7/14 156/244.11 |
| 2016/0155537 | A1 | 6/2016 | Manabe et al. | |
| 2019/0009512 | A1 * | 1/2019 | Kagawa | B32B 37/203 |

OTHER PUBLICATIONS

European Search Report dated Sep. 9, 2022.

* cited by examiner

DYNAMIC CABLES WITH FIBRE REINFORCED THERMOPLASTIC COMPOSITE SHEATH

RELATED APPLICATION

This application claims the benefit of priority from European Patent Application No. 22 305 648.2, filed on May 2, 2022, the entirety of which is incorporated by reference.

FIELD OF THE INVENTION

The present invention relates to dynamic cables for submarine applications.

BACKGROUND

As the world's maritime infrastructure is developing, the use of submarine cables to deliver electric power below, above, in or across bodies of water is rapidly increasing. Submarine power cables are slender structures and are commonly suspended between a floating unit located at the surface of a body of water, from where electric power is typically delivered to equipment on the seabed. The range of applications for submarine power cables is wide, comprising any sea-based installation required to receive or transmit electricity such as oil and gas production installations to renewable energy production sites such as offshore wind farms. The submarine power cables are thus typically exposed to mechanical loads imposed during dynamic movements of the cable from wave motions and underwater currents. The desired lifetime of a submarine power cable is between 10-50 years, and all components in the cable should therefore sustain exposure to mechanical loads for long periods of time.

Submarine power cables are required to have a water barrier sheathing to keep the cable core dry. The water barrier sheathing should completely block convection or diffusion of water, as an ingress of moisture can ultimately lead to a failure of the cable.

A conventional water barrier sheathing is typically manufactured by a continuous or discontinuous extrusion of a seamless tube, and often comprises lead or lead alloys due to their extrudability and high ductility.

However, lead sheath as radial water barrier in dynamic cables is less favourable because the material has poor fatigue properties.

In order to avoid using water barriers made of lead, dynamic cables often comprise a water barrier made of a longitudinally welded metallic sheath (LWS) or a metal-polymer composite structure consisting of a metal layer laminated between two layers of insulating or non-insulating polymer layers. However, these water barriers can reach their limit in terms of operational lifetime in a dynamic setting, such as shallow waters, large power phase cross-section or in particularly harsh environments due to buckling of the LWS or the laminated metal sheath structure.

Increasing the bending stiffness of the dynamic cables, to avoid buckling of the water barrier during mechanical handling, has previously been done by increasing the thickness of the outer thermoplastic sheath or changing its polymer properties. An additional radial metallic armouring sheath underneath the outer thermoplastic sheath is often used.

Moreover, to improve buckling resistance of the LWS, the thickness of the thermoplastic core sheath has been thicker than normal, in particular when used on lead sheathed cables.

Thus, there is a need for improved solutions that prevent buckling of the LWS or the laminated metal sheath structure and at the same time prevent increasing thickness of the inner thermoplastic core sheath and/or outer thermoplastic sheath as increased diameters of the cables makes the cables heavier and more difficult to handle.

OBJECTS AND SUMMARY OF THE INVENTION

The inventors have solved the above-mentioned need by providing a dynamic power cable comprising at least one extruded fibre reinforced thermoplastic sheath to reduce buckling of the LWS or the laminated metal sheath structure and thus improve fatigue life of dynamic cables. Whereby the increased stiffness also has the advantage that it becomes possible to increase the power phase diameter, which will also be increasingly prone to buckling during bending. The present inventors have solved the above-mentioned need by providing in a first aspect a dynamic power cable comprising

- at least one cable core comprising an electrical conductor and an electrically insulating layer that is arranged radially outside the electrical conductor,
- a water barrier sheath arranged radially outside the cable core,
- an extruded inner fibre reinforced thermoplastic composite core sheath arranged radially outside the water barrier sheath.

In one embodiment of the first aspect the dynamic power cable comprises at least three cable cores wherein each cable core has

- a water barrier sheath arranged radially outside each cable core and
- an extruded inner fibre reinforced thermoplastic composite core sheath arranged radially outside each water barrier sheath.

In one embodiment of the first aspect the dynamic power cable further comprises an armouring layer arranged radially outside the at least three cable cores with water barrier sheaths and extruded inner fibre reinforced thermoplastic composite core sheaths, and wherein an extruded outer fibre reinforced thermoplastic composite sheath is arranged radially outside the armouring layer.

In one embodiment of the first aspect the dynamic power cable further comprises an extruded outer fibre reinforced thermoplastic composite sheath arranged radially outside the at least three cable cores with water barrier sheaths and extruded inner fibre reinforced thermoplastic composite core sheaths. In this embodiment there is no requirement for an additional armouring layer, as the extruded outer fibre reinforced thermoplastic composite sheath replaces the traditional armouring layer, accordingly the power cable does not comprise an armouring layer.

In one embodiment of the first aspect the extruded inner and/or extruded outer fibre reinforced thermoplastic composite sheath comprises a thermoplastic polymer reinforced with short fibres wherein the short fibres have a length of about 45 mm or less, such as about 20 mm or less, such as about 15 mm or less, such as about 10 mm or less or such as about 5 mm or less, such as about 4 mm or less, such as about 3 mm or less, such as about 2 mm or less such as about 1.5 mm or less, such as about 1 mm or less.

In one embodiment of the first aspect the extruded inner and/or extruded outer fibre reinforced thermoplastic composite sheath comprises a thermoplastic polymer reinforced with short fibres wherein the short fibres have a length ranging from about 0.1 μm to about 45 mm, such as in a range from about 0.1 μm to about 20 mm, such as in a range from about 0.1 μm to about 10 mm, such as in a range from about 0.1 μm to about 5 mm, such as in a range from about 0.1 μm to about 4 mm, such as in a range from about 0.1 μm to about 3 mm, such as in a range from about 0.1 μm to about 2 mm.

Preferably the short fibres have a length in a range from about 0.1 μm to about 1 mm and more preferably in the range from about 0.1 μm to about 0.5 mm.

In one embodiment of the first aspect the short fibres are selected from glass fibres, carbon fibres, basalt fibres, graphene nanotubes, single- and/or multi-wall carbon nanotubes, graphene platelets, graphene oxide platelets and chopped natural fibres and any combinations thereof.

In one embodiment the chopped natural fibres are selected from jute, bamboo or any combinations thereof.

In one embodiment of the first aspect the short fibres are glass fibres with a length in a range from about 0.1 μm to about 1000 μm.

In one embodiment of the first aspect the short fibres are carbon fibres with a length in a range from about 0.1 μm to about 1000 μm.

In one embodiment of the first aspect the short fibres are basalt fibres with a length in a range from about 0.1 μm to about 1000 μm.

In one embodiment of the first aspect the short fibres are graphene nanotubes.

In one embodiment of the first aspect the short fibres are single- and/or multi-wall carbon nanotubes.

In one embodiment of the first aspect the short fibres are graphene platelets or graphene oxide platelets.

In one embodiment of the first aspect the short fibres are chopped natural fibres.

In one embodiment of the first aspect the extruded inner and/or outer fibre reinforced thermoplastic composite sheath is reinforced with at least 0.01% (v/v) of the above described short fibres, such as at least 0.05% (v/v), such as at least 0.1% (v/v), such as at least 0.5% (v/v), such as at least 1% (v/v), such as at least 5% (v/v), such as at least 10% (v/v), such as at least 20% (v/v).

In one embodiment of the first aspect the extruded inner and/or outer fibre reinforced thermoplastic composite sheath is reinforced with 0.01% to 50% (v/v) short fibres, such as from about 0.01% to about 40% (v/v), such as from about 0.01% to about 30% (v/v), such as from about 0.05% to about 30% (v/v), such as from about 0.1% to about 30% (v/v), such as from about 0.1% to about 10% (v/v), such as from about 5% to about 30% (v/v).

In one embodiment of the first aspect the polymer of the extruded inner and/or outer fibre reinforced thermoplastic composite sheath is selected from: polyethylene and copolymers thereof, polypropylene and copolymers thereof, polyamide and copolymers thereof, polyvinyl chloride (PVC), thermoplastic polyurethane (TPU), cast polyurethane (PU) and any combinations thereof.

In one embodiment of the first aspect the polyethylene is selected from LLDPE, MDPE and HDPE.

In one embodiment of the first aspect the polyamide is Nylon.

In one embodiment of the first aspect, the power cable comprises a further fibre reinforced thermoplastic composite sheath, with wound fibres embedded in a thermoplastic polymer.

In one embodiment of the first aspect the further fibre reinforced thermoplastic composite sheath is reinforced with 1% to 90% (v/v) of wound fibres such as from about 2% to about 90% (v/v) fibres, such as from about 3% to about 90% (v/v) fibres, such as from about 5% to about 80% (v/v) fibres such as from about 1% to about 10% (v/v) fibres, such as from about 10% to about 50% (v/v) fibres or such as from about 50% to about 90% (v/v) fibres.

In one embodiment of the first aspect the wound fibres are selected from: glass fibres, carbon fibres, polypropylene fibres, polyethylene fibres, such as UHMWPE, aramid fibres, liquid crystal polymer fibres, polyester fibres, natural fibres such as jute and sisal and any combinations thereof.

In one embodiment of the first aspect, the further fibre reinforced thermoplastic composite sheath is arranged radially around the extruded inner fibre reinforced thermoplastic composite core sheath.

In one embodiment of the first aspect the further fibre reinforced thermoplastic composite sheath is arranged radially around the extruded outer fibre reinforced thermoplastic composite sheath.

In one embodiment of the first aspect the water barrier sheath is a laminate structure comprising a metal foil laminated between at least two layers of insulating or non-insulating polymers.

In one embodiment of the first aspect the water barrier sheath is a longitudinally welded metallic sheath.

In one embodiment according to the first aspect the dynamic power cable is a high voltage dynamic power cable.

In a second aspect there is provided a method of manufacturing a dynamic power cable comprising an extruded fibre reinforced thermoplastic composite core sheath, wherein the method comprises the steps:

- providing at least one cable core comprising an electrical conductor and an electrically insulating layer arranged radially outside the electrical conductor,
- wrapping a water barrier sheath radially around the cable core forming a watertight sheath,
- extruding a thermoplastic polymer comprising short fibres radially around the water barrier sheath providing an extruded inner fibre reinforced thermoplastic composite core sheath wherein the short fibres have a length of about 45 mm or less, and
- optionally providing an adhesive layer between the water barrier sheath and the extruded inner fibre reinforced thermoplastic composite core sheath in order to bind the extruded inner fibre reinforced thermoplastic composite core sheath to the water barrier sheath.

In one embodiment according to the second aspect the method comprises a further step wherein continuous fibres impregnated with a thermoplastic polymer are wound radially around the fibre reinforced thermoplastic composite core sheath.

In one embodiment according to the second aspect the wound fibres are pre-impregnated with a thermoplastic polymer.

In one embodiment according to the second aspect the fibres are with or without sizing.

In one embodiment of the second aspect the water barrier sheath is a laminate structure comprises a metal foil laminated between at least two layers of insulating or non-insulating polymers.

In one embodiment of the second aspect the water barrier sheath is a longitudinally welded metallic sheath.

In one embodiment according to the second aspect the dynamic power cable is a high voltage dynamic power cable.

In a third aspect there is provided use of the dynamic cable in water applications deeper than 70 m or deeper than 900 m.

In one embodiment according to the third aspect the dynamic power cable is a high voltage dynamic power cable.

DETAILED DESCRIPTION

Figure 1:
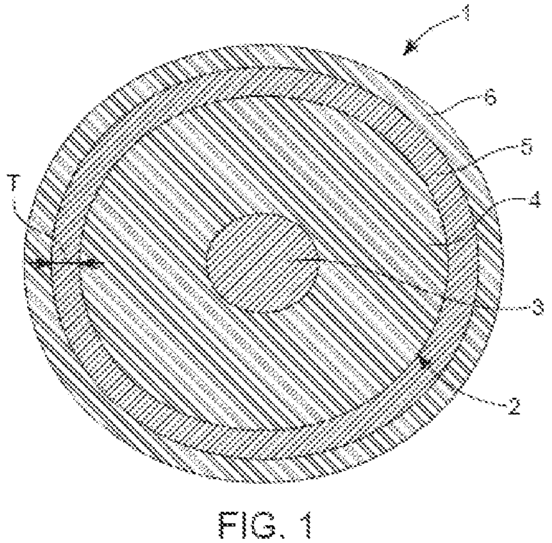
FIG. 1 schematically illustrates one embodiment of the invention, where an example of a dynamic power cable cross section comprising one cable core is shown.

In the following description, various examples and embodiments of the invention are set forth in order to provide the skilled person with a more thorough understanding of the invention. The specific details described in the context of the various embodiments and with reference to the attached drawings are not intended to be construed as limitations.

Where a numerical limit or range is stated herein, the endpoints are included. Also, all values and sub ranges within a numerical limit or range are specifically included as if explicitly written out.

Definitions

The term "high voltage" as applied herein refers to a voltage above 36 kV such as in the range 50 kV to 800 kV.

The term "dynamic" is applied herein to refer to cables that in use are exposed to movement.

A submarine dynamic power cable is a power cable installed and allowed to move between two fixed supports. One support is located at the ocean floor and one is located at the sea level. The movement of the floating installation will induce mechanical load and fatigue on the dynamic cable.

The term "short fibres" as applied herein refers to synthetic or natural fibres with a length of 45 mm or less. It is well known to a skilled person that the length of the fibres may vary depending on the needed stiffness of the fibre reinforced sheath. Thus, use of fibres with any length of about 45 mm or less will not depart from the present invention.

The term "sizing" as applied herein refers to coating or priming applied to the surface of fibres to protect the fibres and increase adhesion between polymer matrix and fibers.

The term "% v/v" as applied herein refers to volume concentration or percent volume.

The terms "wound fibres" or "winding fibres" as applied herein refer to continuous fibres.

Fibre Reinforced Thermoplastic Composite Sheath Comprising Short Fibres

As mentioned above the present invention provides a dynamic power cable comprising at least one extruded fibre reinforced thermoplastic composite sheath for reducing buckling of the water barrier sheath. Thus, it improves fatigue life of dynamic power cables and provides satisfactory ductility and stiffness of the cable.

The at least one extruded fibre reinforced thermoplastic sheath may comprise short fibres wherein the short fibres have a length of 45 mm or less, such as 20 mm or less, such as 15 mm or less, such as 10 mm or less or such as 5 mm or less, such as 4 mm or less, such as 3 mm or less, such as 2 mm or less such as 1.5 mm or less, such as 1 mm or less.

Alternatively, the short fibres may have a length in a range from 0.05 μm to 45 mm, such as in a range from 0.1 μm to 20 mm, such as in a range from 0.1 μm to 10 mm, such as in a range from 0.1 μm to 5 mm, such as in a range from 0.1 μm to 4 mm, such as in a range from 0.1 μm to 3 mm, such as in a range from 0.1 μm to 2 mm, such as in a range from 0.1 μm to 1 mm, such as in a range from 0.1 μm to 0.5 mm.

Preferably the short fibres have a length in a range from about 0.1 μm to about 1 mm and more preferably in the range from about 0.1 μm to about 0.5 mm.

The short fibres may be selected from: glass fibres, carbon fibres, basalt fibres, graphene nanotubes, single- and/or multi-wall carbon nanotubes, graphene platelets, graphene oxide platelets, chopped natural fibres and any combination thereof.

The chopped natural fibres may be selected from jute, bamboo and any combinations thereof.

The short fibres may be with or without sizing, unidirectional or multi-directional.

The short fibres may be glass fibres with a length in a range from about 0.1 μm to about 1000 μm.

The short fibres may be carbon fibres with a length in the range from about 0.1 μm to about 1000 μm.

The short fibres may be basalt fibres with a length in the range from about 0.1 μm to about 1000 μm.

The amount of fibres in the extruded fibre reinforced thermoplastic composite sheath may vary and may comprise at least 0.01% (v/v) of the above-described short fibres, such as at least 0.05% (v/v), such as at least 0.1% (v/v), such as at least 0.5% (v/v), such as at least 1% (v/v), such as at least 5% (v/v), such as at least 10% (v/v), such as at least 20% (v/v).

Alternatively, the amount of short fibres in the extruded fibre reinforced thermoplastic composite sheath may be in the range from 0.01% to 50% (v/v), such as 0.01% to 40% (v/v), such as 0.01% to 30% (v/v), such as 0.05% to 30% (v/v), such as 0.1% to 30% (v/v), such as 1% to 30% (v/v), such as 5% to 30% (v/v), such as 0.01% to 5% (v/v), such as 10% to 30% (v/v), such as 10% to 20% (v/v).

The thermoplastic polymer of the extruded fibre reinforced thermoplastic composite sheath may be selected from: polyethylene such as LLDPE, MDPE, HDPE and copolymers thereof, polypropylene and copolymers thereof, polyamide such as Nylon and copolymers thereof, polyvinyl chloride (PVC), thermoplastic polyurethane (TPU), cast polyurethane (PU) and any combinations thereof.

Further fibre reinforced thermoplastic composite sheath comprising wound fibres embedded in a thermoplastic polymer In order to further increase the stiffness of the dynamic power cable, the power cable may comprise a further fibre reinforced composite sheath comprising wound fibres embedded in a thermoplastic polymer.

The amount of fibres in the further fibre reinforced thermoplastic composite sheath may vary and may comprise at least 1% (v/v) wound fibres, such as at least 5% (v/v) fibres, such as at least 10% (v/v) fibres, such as at least 20% (v/v) fibres, such as at least 30% (v/v) fibres, such as at least 40% (v/v) fibres, such as at least 50% (v/v) fibres, such as at least 60% (v/v) fibres, such as at least 70% (v/v) fibres or such as at least 80% (v/v) fibres.

Alternatively, the amount of fibres in the further fibre reinforced thermoplastic composite sheath may be in the range from about 1% to about 90% (v/v) wound fibres, such as from about 2% to about 90% (v/v) fibres, such as from about 3% to about 90% (v/v) fibres, such as from about 5% to about 80% (v/v) fibres, such as from about 1% to about 10% (v/v) fibres, such as from about 10% to about 50% (v/v) fibres or such as from about 50% to about 90% (v/v) fibres.

The wound fibres as applied herein are continuous fibres.

The wound fibres may be filaments, rovings or fabrics.

The wound fibres may be with or without sizing.

The term "filament" as applied herein refers to individual fibres.

The term "roving" as applied herein refers to bundles of separate filaments.

The wound fibres may be in form of tapes, wherein the fibres may be unidirectional or multi-directional, such as woven fabrics, and with or without sizing. The tape width may be from about 1 mm to about 1000 mm.

The wound fibres may be selected from: glass fibres, carbon fibres, polypropylene fibres, polyethylene fibres (e.g. UHMWPE), aramid fibres, liquid crystal polymer fibres (e.g. Vectran), polyester fibres, natural fibres and any combinations thereof.

The natural fibres may be selected from jute, sisal and any combination thereof.

The wound fibres in form of filaments, rovings or fabrics may be pre-impregnated with a thermoplastic polymer in order to improve cable processing and insulation.

The fibre tapes may be pre-impregnated with a thermoplastic polymer comprising short fibers as described above.

The thermoplastic polymer may be insulating or non-insulating.

The term "insulation" or "non-insulating" refers herein to the electrical conductivity of the material.

The thermoplastic polymer in which the wound fibres are embedded or for pre-impregnation of the winding fibres may be selected from: polyethylene, such as LLDPE, MDPE, HDPE, and copolymers thereof, polypropylene and copolymers thereof, polyamide such as Nylon and copolymers thereof, polyvinyl chloride (PVC), thermoplastic polyurethane (TPU), cast polyurethane (PU) and any combinations thereof.

The fibres can be applied in a single layer in one direction or several layers (plies) with multiple directions forming a stiff composite laminate. The fibre direction spans from 0 to 90 degrees with respect to the cable axis. The winding of the further fibre reinforced thermoplastic composite sheath might require a multi-step process, such as fibre placement followed by extrusion with assisting operations, like compaction or pre-heating.

Figure 2:
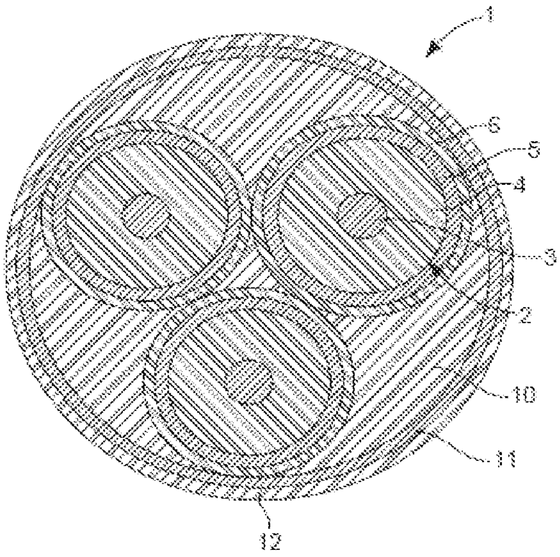
FIG. 2 schematically illustrates one embodiment of the invention, where an example of a dynamic power cable cross section comprising three cable cores is shown.

A dynamic power cable comprising at least one extruded fibre reinforced thermoplastic composite sheath The invention is described further with reference to FIG. 1 and FIG. 2 of the drawings, which show a schematic of the cross-section of an embodiment of the cable of the invention.

FIG. 1 schematically illustrates an example of a cross-section of a dynamic power cable 1, where the cable 1 is shown with one cable core 2. This invention is however not limited to a one-core cable, and the cable 1 may comprise two or any higher number of cores 2, as is deemed suitable for the cable's purposes. Accordingly, FIG. 2 illustrates an example of a dynamic power cable 1 cross-section comprising three cable cores 2.

Each core 2 comprises an electrical conductor 3 arranged in the centre of the core 2, and an electrically insulating layer 4 arranged radially outside each conductor 3. Outside the first electrically insulating layer 4, though not illustrated in the Figures, there may be arranged a layer of sealing material disposed between the electrically insulating layer 4 and a water barrier sheath 5. This sealing material swells upon contact with water thereby working as an extra redundancy measure to prevent ingress of moisture in case of a crack or other failure in the water barrier sheath 5.

In one preferred aspect, there is an extruded inner fibre reinforced thermoplastic composite core sheath 6 radially outside the water barrier sheath 5 wherein the composite comprises the above-described short fibres.

This extruded inner fibre reinforced thermoplastic composite core sheath 6 may be extruded radially onto the water barrier sheath 5. This extrusion process is not detailed further herein since this is a well-known process in the art and will be apparent to the person skilled in the art.

In another solution, an intermediate adhesive layer binds the water barrier sheath 5 to the extruded inner thermoplastic composite core sheath 6.

The power cable may comprise a further fibre reinforced thermoplastic composite sheath radially outside the extruded inner thermoplastic composite core sheath 6.

The further fibre reinforced thermoplastic composite sheath outside the extruded inner thermoplastic composite core sheath 6 may be a fibre reinforced thermoplastic composite sheath comprising wound fibres embedded in a polymer. Details of the composite comprising wound fibres embedded in a polymer are described above.

The further fibre reinforced thermoplastic composite sheath may be wound radially onto the extruded inner thermoplastic composite core sheath 6, alternatively there is an intermediate extruded thermoplastic sheath between the extruded inner fibre reinforced thermoplastic composite sheath 6 and the further fibre reinforced thermoplastic composite sheath comprising wound fibres.

It should be noted that the cable 1, and variations thereof, may comprise additional layers, or filling material 10, as exemplified in FIG. 2, arranged radially outside each conductor 3 or the at least one cable core 2, which will not be described further herein. These layers and materials may be arranged inside, in-between or outside the layers already mentioned herein, and may comprise for example additional insulating, semiconducting, conducting, shielding and armouring layers as is well known in the art.

The dynamic power cable may be a direct current (DC) power cable or an alternating current (AC) power cable.

The dynamic power cable may be a high voltage dynamic power cable.

In one aspect, one cable core 2 may be put together with several other cable cores, as is illustrated in FIG. 2.

For example, the dynamic power cable may comprise at least three cable cores 2 wherein each cable core has:

- a water barrier sheath 5 that is arranged radially outside the cable core 2 and
- an extruded inner fibre reinforced thermoplastic composite core sheath 6 arranged radially outside the water barrier sheath 5 wherein the extruded inner fibre reinforced thermoplastic composite core sheath 6 comprises short fibres in a thermoplastic polymer.

There is also provided a method of manufacturing a dynamic power cable comprising an extruded fibre reinforced thermoplastic composite core sheath, wherein the method comprises the steps:

- providing at least one cable core 2 comprising an electrical conductor 3 and an electrically insulating layer 4 arranged radially outside the electrical conductor 3,
- wrapping a water barrier sheath 5 radially around the cable core 2 forming a watertight sheath,
- extruding a thermoplastic polymer comprising short fibres radially around the water barrier sheath 5 providing an extruded inner fibre reinforced thermoplastic composite core sheath 6 wherein the short fibres have a length of about 45 mm or less, and
- optionally providing an adhesive layer between the water barrier sheath 5 and the extruded inner fibre reinforced thermoplastic composite core sheath 6 in order to bind the extruded inner fibre reinforced thermoplastic composite core sheath 6 to the water barrier sheath 5.

Details of the short fibres and the thermoplastic polymers are described above.

The method may comprise a further step wherein continuous fibres impregnated with a thermoplastic polymer are wound radially around the extruded inner fibre reinforced thermoplastic composite core sheath 6.

The wound fibres may be pre-impregnated with a thermoplastic polymer.

Details of the wound fibres and the thermoplastic polymers are described above.

The wound fibres may be with or without sizing.

The wound fibres may be applied in a single layer in one direction or several layers, such as plies, with multiple directions forming a stiff composite laminate. A skilled person understands that single- or multiple layers will provide different stiffness to the extruded inner fibre reinforced thermoplastic composite core sheath and may thus be varied.

The direction of the wound fibres may span from 0 to 90 degrees with respect to the cable axis.

The extruded inner fibre reinforced thermoplastic composite core sheath comprising wound fibres might require a multi-step process, such as fibre placement followed by extrusion with assisting operations, like compaction or preheating.

Filament winding technique may be used for winding of the filaments radially around the cable. Filament winding is a process involving winding fibres under tension over for example a rotating mandrel or directly over the cable core. The fibres are impregnated with resin such as a thermoplastic polymer by passing through a bath as they are winding, thus forming a fibre composite material.

Filament winding is a process well-known to a skilled person.

An alternative sheath design can be done by winding prefabricated fibre tapes. The tapes can be compacted and melt-fused by means of external heating, such as laser, heat guns and heated rollers, or internal heating from the power core made by induction coils. Tape winding assisted by compaction and fusion is a process well-known to a skilled person.

A dynamic power cable comprising further fibre reinforced thermoplastic composite sheaths In one further aspect, where the power cable comprises at least three cable cores, the power cable may further comprise an armouring layer 11 arranged radially outside the at least three cores 2, and an extruded outer fibre reinforced thermoplastic composite sheath 12 comprising short fibres in a thermoplastic polymer may be arranged radially outside the armouring layer 11.

In the above aspect the power cable may comprise a further fibre reinforced thermoplastic composite sheath radially outside the extruded outer fibre reinforced thermoplastic composite sheath 12, wherein the further fibre reinforced thermoplastic composite sheath comprises wound fibres embedded in a thermoplastic polymer.

In another aspect, where the power cable comprises at least three cable cores, the power cable may further comprise an extruded outer thermoplastic composite sheath 12 comprising short fibres in a thermoplastic polymer that is arranged radially outside the at least three cable cores 2. In this embodiment there is no requirement for an additional armouring layer, as the extruded outer fibre reinforced thermoplastic composite sheath replaces the traditional armouring layer, accordingly the power cable does not comprise an armouring layer.

With reference to a power cable without an armouring layer 11, the power cable may in this aspect comprise a further fibre reinforced thermoplastic polymer sheath arranged radially outside the extruded outer fibre reinforced thermoplastic composite sheath 12, wherein the further fibre reinforced thermoplastic composite sheath comprises wound fibres embedded in a thermoplastic polymer.

The further fibre reinforced thermoplastic composite sheath may be wound radially onto the extruded outer fibre reinforced thermoplastic composite sheath 12, alternatively there is an intermediate extruded thermoplastic sheath between the extruded outer fibre reinforced thermoplastic composite sheath 12 and the further fibre reinforced thermoplastic composite sheath comprising wound fibres.

Details of the fibres and the polymers are described above.

The Water Barrier Sheath

In one aspect the water barrier sheath may be a laminated metal sheath structure.

Wherein the water barrier sheath 5 is a water barrier laminate, the water barrier laminate comprises a metal foil laminated between at least two layers of insulating or non-insulating polymers constituting a final laminate that is electrically insulating or electrically non-insulating.

Isolating and non-isolating polymer layers for use in the laminated structure are well known to a skilled person and examples of non-isolating polymer layers may be found in EP 2 437 272.

The term "metal foil" as used herein refers to the metal layer in the middle of the laminate structure. The invention is not tied to use of any specific metal/metal alloy or thickness of the metal foil. Any metal/metal alloy at any thickness known to be suited for use in water barriers in power cables by the skilled person may be applied. In one example embodiment, the metal foil is either a Ti/Ti-alloy, Al/Al-alloy, a Cu/Cu-alloy or a Fe/Fe-alloy. The thickness of the metal foil may be in one of the following ranges; from 10 to 250 μm, preferably from 15 to 200 μm, more preferably from 20 to 150 μm, more preferably from 25 to 100 μm, and most preferably from 30 to 75 μm.

Alternatively, the water barrier sheath may be a metallic longitudinally welded metal sheath (LWS).

The present invention is not tied to the use of a any specific metal/metal alloy in the LWS.

In one aspect the LWS is made of commercially pure titanium or a titanium alloy.

In one aspect the LWS is made of commercially pure tin or a tin alloy.

In another aspect the LWS is made of commercially pure copper or a copper alloy.

In another aspect the LWS is made of commercially pure aluminium or an aluminium alloy.

In another aspect the LWS is made of stainless steel.

The Conductors

Power cables for intermediate to high current capacities have typically one or more electric conductors at their core followed by electric insulation and shielding of the conductors, an inner sheathing protecting the core, armouring layer, and an outer sheathing. The conductors of power cables are typically made of either aluminium or copper. The conductor may either be a single strand surrounded by electric insulating and shielding layers, or a number of strands arranged into a bunt being surrounded by electric insulating and shielding layers.

The invention claimed is:

1. A dynamic power cable comprising:

at least one cable core comprising an electrical conductor and an electrically insulating layer that is arranged radially outside the electrical conductor, a water barrier sheath arranged radially outside the cable core, an extruded inner fibre reinforced thermoplastic composite core sheath arranged radially outside the water barrier sheath.

2. The dynamic power cable according to claim 1, comprising at least three cable cores, wherein each cable core has:

a water barrier sheath arranged radially outside each cable core, and an extruded inner fibre reinforced thermoplastic composite core sheath arranged radially outside each water barrier sheath.

3. The dynamic power cable according to claim 2, wherein the power cable further comprises an armouring layer arranged radially outside the at least three cable cores with water barrier sheaths and extruded inner fibre reinforced thermoplastic composite core sheaths, and wherein an extruded outer fibre reinforced thermoplastic composite sheath is arranged radially outside the armouring layer.

4. The dynamic power cable according to claim 3, wherein the extruded outer fibre reinforced thermoplastic composite sheath comprises a thermoplastic polymer reinforced with short fibres wherein the short fibres have a length of about 45 mm or less.

5. The dynamic power cable according to claim 3, wherein the extruded outer fibre reinforced thermoplastic composite sheath comprises a thermoplastic polymer reinforced with short fibres selected from: glass fibres, carbon fibres, basalt fibres, graphene nanotubes, single- and/or multi-wall carbon nanotubes, graphene platelets, graphene oxide platelets, chopped natural fibres and any combinations thereof.

6. The dynamic power cable according to claim 3, wherein the extruded outer fibre reinforced thermoplastic composite sheath is reinforced with at least 0.01% v/v of short fibres.

7. The dynamic power cable according to claim 3, wherein the extruded outer fibre reinforced thermoplastic composite sheath comprises a thermoplastic polymer reinforced with short fibres wherein the short fibres have a length of about 45 mm or less, and wherein a further fibre reinforced thermoplastic composite sheath is arranged radially around the extruded outer fibre reinforced thermoplastic composite sheath.

8. The dynamic power cable according to claim 2, wherein the power cable further comprises an extruded outer fibre reinforced thermoplastic composite sheath arranged radially outside the at least three cable cores with water barrier sheaths and extruded inner fibre reinforced thermoplastic composite core sheaths and wherein the power cable does not comprise an armouring layer.

9. The dynamic power cable according to claim 1, wherein the extruded inner fibre reinforced thermoplastic composite core sheath comprises a thermoplastic polymer reinforced with short fibres wherein the short fibres have a length of about 45 mm or less.

10. The dynamic power cable according to claim 1, wherein the extruded inner fibre reinforced thermoplastic composite core sheath comprises a thermoplastic polymer reinforced with short fibres selected from: glass fibres, carbon fibres, basalt fibres, graphene nanotubes, single- and/or multi-wall carbon nanotubes, graphene platelets, graphene oxide platelets, chopped natural fibres and any combinations thereof.

11. The dynamic power cable according to claim 1, wherein the extruded inner fibre reinforced thermoplastic composite core sheath is reinforced with at least 0.01% v/v of short fibres.

12. The dynamic power cable according to claim 1, wherein the dynamic power cable comprises a further fibre reinforced thermoplastic composite sheath, with wound fibres embedded in a thermoplastic polymer.

13. The dynamic power cable according to claim 12, wherein the further fibre reinforced thermoplastic composite sheath is arranged radially around the extruded inner fibre reinforced thermoplastic composite core sheath.

14. The dynamic power cable according to claim 1, wherein the water barrier sheath is a laminate structure comprising a metal foil laminated between at least two layers of insulating or non-insulating polymers or wherein the water barrier sheath is a longitudinally welded metallic sheath.

15. A method of manufacturing a dynamic power cable having an extruded fibre reinforced thermoplastic composite core sheath, said method comprising the steps of:

providing at least one cable core comprising an electrical conductor and an electrically insulating layer arranged radially outside the electrical conductor, wrapping a water barrier sheath radially around the cable core forming a watertight sheath, extruding a thermoplastic polymer comprising short fibres radially around the water barrier sheath providing an extruded inner fibre reinforced thermoplastic composite core sheath wherein the short fibres have a length of about 45 mm or less, and optionally providing an adhesive layer between the water barrier sheath and the extruded inner fibre reinforced thermoplastic composite core sheath in order to bind the extruded inner fibre reinforced thermoplastic composite core sheath to the water barrier sheath.

* * * * *